United States Patent
Auclair et al.

(10) Patent No.: US 9,538,272 B2
(45) Date of Patent: Jan. 3, 2017

(54) ACOUSTIC MESH AND METHODS OF USE FOR ELECTRONIC DEVICES

(71) Applicant: APPLE INC., Cupertino, CA (US)

(72) Inventors: Martin J. Auclair, Cupertino, CA (US); Jared M. Kole, San Francisco, CA (US); Ashutosh Y. Shukla, Santa Clara, CA (US); Scott A. Myers, Saratoga, CA (US); David A. Pakula, Palo Alto, CA (US); Marwan Rammah, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 137 days.

(21) Appl. No.: 14/659,319

(22) Filed: Mar. 16, 2015

(65) Prior Publication Data

US 2016/0073194 A1    Mar. 10, 2016

Related U.S. Application Data (60) Provisional application No. 62/047,441, filed on Sep. 8, 2014, provisional application No. 62/047,567, filed on Sep. 8, 2014.

(51) Int. Cl.
| | |
|---|---|
| *H04R 1/02* | (2006.01) |
| *H04R 1/08* | (2006.01) |
| *H04R 25/00* | (2006.01) |
| *G10K 11/18* | (2006.01) |
| *G06F 1/16* | (2006.01) |

(52) U.S. Cl.
CPC ............. *H04R 1/023* (2013.01); *G06F 1/1626* (2013.01); *G06F 1/1656* (2013.01); *G06F 1/1688* (2013.01); *G10K 11/18* (2013.01); *H04R 1/086* (2013.01); *H04R 25/654* (2013.01); *H04R 2499/11* (2013.01)

(58) Field of Classification Search
CPC ........... H04R 1/02; H04R 1/026; H04R 1/086; H04R 25/654; H04R 2499/11; H04R 2499/15
See application file for complete search history.

(56) References Cited

U.S. PATENT DOCUMENTS

| | | | | |
|---|---|---|---|---|
| 4,349,082 A | * | 9/1982 | Gastmeier | H04R 25/48 181/130 |
| 4,987,597 A | * | 1/1991 | Haertl | H04R 25/654 381/325 |
| 5,828,012 A | * | 10/1998 | Repolle | H04R 1/023 181/175 |

(Continued)

*Primary Examiner* — Matthew Eason
(74) *Attorney, Agent, or Firm* — Kilpatrick Townsend & Stockton, LLP (57) ABSTRACT

An acoustically permeable material is disposed within an aperture of an electronic device to provide aesthetic appeal for the electronic device and protection for an acoustic device mounted within the electronic device. A stiffener is used in conjunction with the acoustically permeable material to improve its ability to resist permanent mechanical deformation from external forces. In some embodiments the stiffener may have multiple cavities enabling improved isolation between multiple acoustic devices within the same aperture. Other methods of employing acoustically permeable materials are disclosed that improve the aesthetic appeal, acoustic performance and/or manufacturability of the electronic device.

20 Claims, 5 Drawing Sheets

(56) References Cited

U.S. PATENT DOCUMENTS

| | | | | |
|---|---|---|---|---|
| 6,512,834 B1* | 1/2003 | Banter | H04R 1/086 | 381/189 |
| 6,554,097 B2* | 4/2003 | Konig | H04R 1/1075 | 181/129 |
| 6,932,187 B2* | 8/2005 | Banter | H04R 1/086 | 181/149 |
| 8,091,680 B2* | 1/2012 | Killion | H04R 25/48 | 181/129 |
| 8,112,130 B2* | 2/2012 | Mittleman | H04M 1/035 | 455/575.1 |
| 8,141,678 B2* | 3/2012 | Ikeyama | C09J 7/0282 | 181/167 |
| 8,442,254 B2* | 5/2013 | Yu | H04R 1/025 | 381/334 |
| 8,631,558 B2* | 1/2014 | Liang | H04R 1/00 | 29/592 |
| 9,374,635 B2* | 6/2016 | Kole | H04R 1/023 | |
| 2002/0096390 A1* | 7/2002 | Killion | H04R 25/48 | 181/129 |
| 2004/0240694 A1* | 12/2004 | Wolf | H04R 25/654 | 381/322 |
| 2006/0042865 A1* | 3/2006 | Berg | A61F 11/08 | 181/135 |
| 2009/0245565 A1* | 10/2009 | Mittleman | H04M 1/035 | 381/365 |
| 2012/0045081 A1* | 2/2012 | Mittleman | H04M 1/035 | 381/334 |
| 2012/0163643 A1* | 6/2012 | Vestergaard | H04R 25/654 | 381/325 |
| 2012/0177237 A1* | 7/2012 | Shukla | B29C 45/1671 | 381/332 |
| 2013/0170109 A1* | 7/2013 | Cohen | H04M 1/03 | 361/679.01 |
| 2013/0271902 A1* | 10/2013 | Lai | H04R 1/02 | 361/679.01 |

* cited by examiner

ACOUSTIC MESH AND METHODS OF USE FOR ELECTRONIC DEVICES

CROSS REFERENCE TO RELATED APPLICATIONS

This application claims priority to U.S. provisional patent application Ser. No. 62/047,441, for "EARPIECE INTEGRATED MAGNETIC SHIELDING FOR MITIGATING INGRESS OF MAGNETIC PARTICLES" and U.S. provisional patent application Ser. No. 62/047,567, for "ACOUSTIC MESH AND METHODS OF USE FOR ELECTRONIC DEVICES" which are hereby incorporated by reference in their entirety for all purposes.

FIELD

The described embodiments relate generally to electronic devices that employ acoustic devices that communicate with the environment through apertures within the housing of the electronic device. More particularly, the present embodiments relate to acoustic meshes that are employed within the apertures.

BACKGROUND

Currently there are a wide variety of electronic devices that have apertures within their housings to allow acoustic devices (e.g., microphones and speakers) located within the electronic device to acoustically communicate with the outside environment. To protect the electronic devices from damage acoustically permeable materials may be employed within or proximate the apertures.

New electronic devices may require new features or new methods of implementing acoustically permeable materials to improve their performance and/or aesthetics.

SUMMARY

An electronic device having an aperture with an acoustic mesh disposed within it is disclosed. In one embodiment an electronic device has a housing having an outer surface opposite and adjacent to an inner surface. The housing may further have an aperture disposed within it wherein the aperture has an inner wall extending from the outer surface to the inner surface of the housing. An acoustic mesh is disposed at least partially within the aperture. The acoustic mesh has a flange portion disposed adjacent the inner surface of the housing and a vertical portion disposed within the aperture along the inner wall. The acoustic mesh may further have a horizontal portion extending across the aperture such that the aperture is optically obscured.

In further embodiments a stiffener may be used in conjunction with the acoustic mesh. The stiffener may have a horizontal flange disposed along the flange portion of the acoustic mesh such that it compresses the acoustic mesh against the inner surface of the housing. The stiffener may further have a vertical wall disposed adjacent to the vertical portion of the acoustic mesh such that the acoustic mesh is disposed between the vertical wall of the stiffener and the inner wall of the aperture. In yet further embodiments, the vertical wall of the stiffener has a distal end that is positioned proximate the horizontal portion of the acoustic mesh.

In some embodiments the acoustic mesh comprises multiple woven wires that may be made from steel. In other embodiments the acoustic mesh may be formed into a cup-shaped structure such that the flange portion is disposed adjacent the inner surface of the housing and the horizontal portion is substantially coplanar with the outer surface of the housing.

In some embodiments the flange portion of the acoustic mesh is secured to the inner surface of the housing with a PSA and the horizontal flange of the stiffener is secured to the horizontal portion of the acoustic mesh with a PSA. In other embodiments a flexible boot structure is secured to the stiffener, and has an opening aligned with the aperture in the housing.

In another embodiment an acoustic mesh is disposed against the inner surface of the housing and across the aperture, and has a mounting portion that extends beyond a perimeter of the aperture. An elastomeric layer is disposed against the inner surface of the housing and encircles the acoustic mesh. A bracket is disposed within the housing and has a protrusion configured to compress the mounting portion of the acoustic mesh to the inner surface of the housing. The bracket has a second surface configured to compress the elastomeric layer against the inner surface of the housing.

In some embodiments the elastomeric layer forms an acoustic seal between the bracket and the housing. In other embodiments an acoustic device is in communication with the aperture and secured to the bracket. The elastomeric layer has a first PSA that adheres it to the inner surface of the housing and a second PSA layer that secures it to the bracket. A plate is disposed adjacent the bracket that secures the bracket against the housing. In some embodiments the acoustic mesh comprises woven wires.

DETAILED DESCRIPTION

Certain embodiments of the present invention relate to acoustically permeable materials and methods of employing them in electronic devices. While the present invention can be useful for a wide variety of configurations, some embodiments of the invention are particularly useful for electronic devices that use wire mesh for such materials, as described in more detail below.

Figure 1:
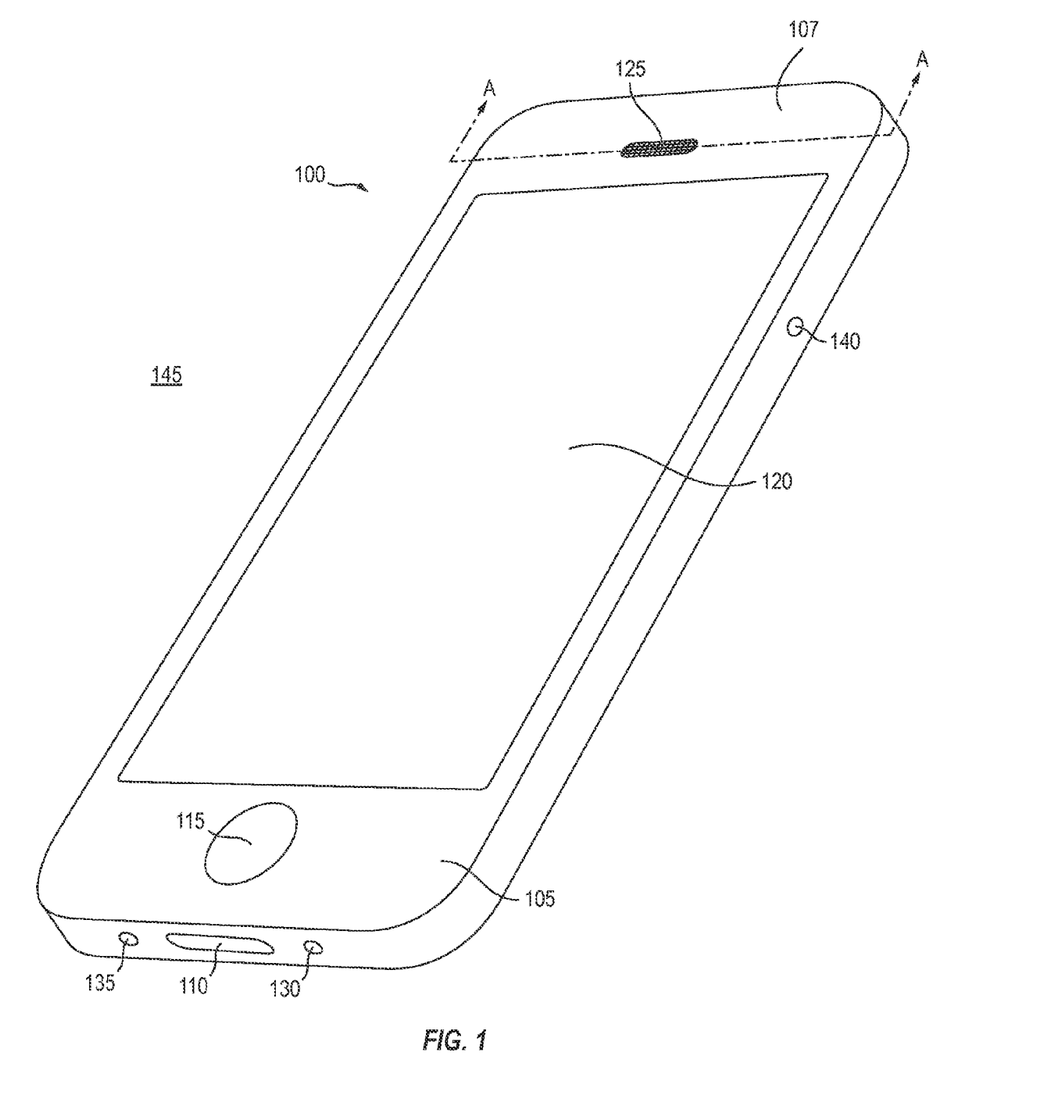
FIG. 1 is a front perspective view of an electronic device according to an embodiment of the invention.

FIG. 1 depicts an illustrative rendering of one embodiment of an electronic device 100 that includes a housing 105 with outer surface 107. Device 100 further includes a receptacle connector 110, a multipurpose button 115 as an input component and a touch screen display 120 as both an input and output component. Electronic device 100 may also have one or more apertures 125, 130, 135, 140 within housing 105 that interface with one or more acoustic elements (e.g., a speaker or a microphone) within the electronic device. For example, aperture 125 may contain a speaker for a user to hear a caller and a microphone for noise cancellation. In other embodiments aperture 130 may contain a microphone to receive a user's voice or to record ambient noise for noise cancellation. Further embodiments may have a loudspeaker aperture 135 containing a speaker for features such as a speakerphone. Electronic device 100 may have additional apertures disposed in housing 105, such as aperture 140 that may contain a microphone for features such as noise cancellation. Although examples of apertures containing acoustic elements have been provided, other configurations are possible and within the scope of this disclosure.

Apertures 125, 130, 135, 140 may enable sound waves to travel through housing 105 such that acoustic elements disposed within electronic device 100 may acoustically communicate with outside environment 145. In further embodiments an acoustic mesh may be disposed within one or more of the apertures and be situated between the acoustic element and exterior surface 107 of housing 105 such that it protects the acoustic element from damage and provides an aesthetic appearance. The acoustic mesh may be acoustically permeable and held in place by a stiffener such that the acoustic mesh may be resilient to permanent deformation, as described in more detail below.

Figure 2:
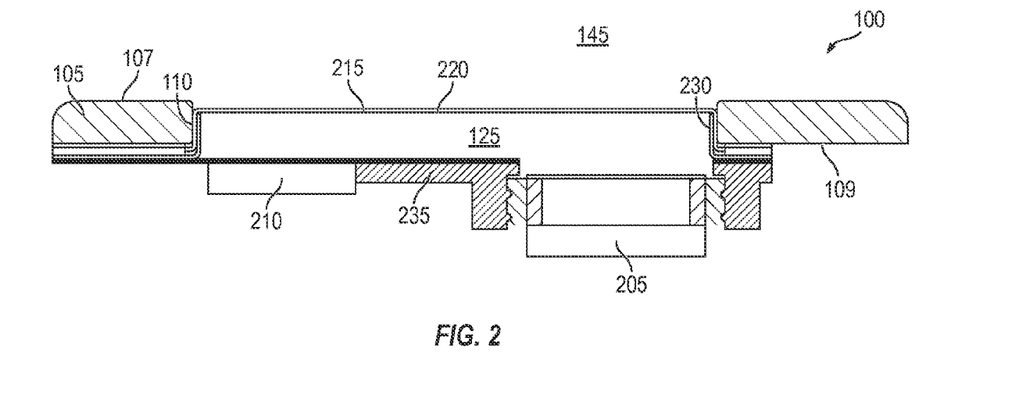
FIG. 2 is a partial cross-sectional view of the receiver aperture of the electronic devices shown in FIG. 1.

As an illustrative example of an embodiment, a simplified partial cross-section of aperture 125 (see section A-A) in electronic device 100 is shown in FIG. 2. Housing 105 may have outer surface 107 opposite and adjacent to an inner surface 109. In some embodiments an aperture 125 may be disposed within housing 105 and have an inner wall 110 extending from outer surface 107 to inner surface 109. In one embodiment, aperture 125 may provide a path for sound waves to travel through housing 105 to a speaker 205 and a microphone 210 disposed within electronic device 100. In further embodiments speaker 205 may be used for a user to hear a caller and microphone 210 may be used for noise cancellation or other purposes.

An acoustic mesh 215 may be disposed at least partially within aperture 125 and located between exterior environment 145 and the acoustic elements (i.e., speaker 205 and microphone 210). Acoustic mesh 215 may be acoustically permeable and have a horizontal portion 220 extending across aperture 125. In some embodiments, horizontal portion 220 may be substantially coplanar with exterior surface 107 of housing 105 such that it may provide a substantially uniform exterior surface for electronic device 100 for an aesthetically appealing appearance. That is acoustic mesh 200 may partially obscure microphone 205 and speaker 210 from view from outside of housing 105, providing a more uniform appearance to outer surface 107 of electronic device 100. In other embodiments acoustic mesh 215 may be disposed below exterior surface 107. Acoustic mesh 200 may be held in place with a stiffener 230 such that it may be precisely positioned within aperture 125 and be resilient to mechanical deformation, as discussed in more detail below. Speaker 205 and microphone 210 may be attached to a flexible boot 235 that is secured to stiffener 230 with a pressure sensitive adhesive (PSA) or other material.

Figure 3:
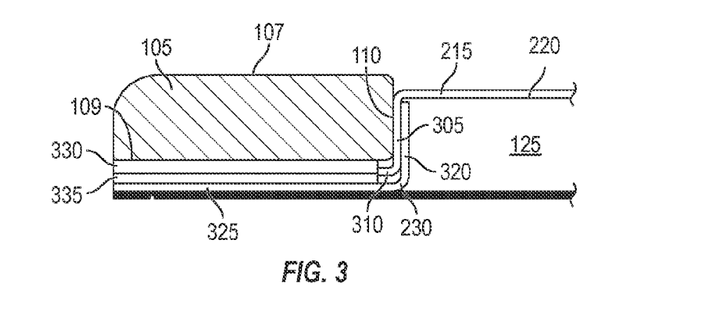
FIG. 3 is an enlarged portion of the cross-sectional view shown in FIG. 2.

Now referring to FIG. 3, a magnified cross-sectional view of stiffener 230 and acoustic mesh 215 disposed in aperture 125 is illustrated. Acoustic mesh 215 has a horizontal portion 220 that covers aperture 125, a vertical portion 305 that extends through aperture 125 and a flange portion 310 that extends parallel and adjacent to inside surface 109 of housing 105. In some embodiments, stiffener 230 may have a vertical wall 320 that extends around the inner perimeter of aperture 125 such that acoustic mesh 215 is disposed between the vertical wall of the stiffener and inner wall 110 of the aperture.

Stiffener 230 may be made from a material that is relatively rigid that resists movement of acoustic mesh 215 as discussed in more detail below. Stiffener 230 may also have a horizontal flange 325 that may compress horizontal flange 310 of acoustic mesh 215 against inner surface 109 of housing 105, holding the acoustic mesh in place within aperture 125. In some embodiments, vertical wall 320 of stiffener 230 may extend to exterior surface 107 of housing 105, while in other embodiments the vertical wall may be recessed from the exterior surface. In yet further embodiments, vertical wall 320 may be disposed around only a portion of the perimeter of aperture 125. Flange portion 310 of acoustic mesh 215 may be adhered to housing 105 and to horizontal flange 325 of stiffener 230 with a first layer 330 and a second layer 335 respectively, of a PSA.

Stiffener 230 may hold acoustic mesh 215 to be substantially coplanar with exterior surface 107 of housing 105 and aid the acoustic mesh in retaining its shape when subjected to external forces. For example, in some applications electronic device 100 may be placed in a pocket or a purse along with a set of keys or other hard object. The keys may be pressed against acoustic mesh 215 causing it to deform. In some embodiments, where acoustic mesh 215 is constructed from wire, the acoustic mesh may sustain permanent plastic deformation, marring its aesthetic appearance. In such embodiments, stiffener 230 may provide acoustic mesh 215 increased resilience to plastic deformation by reinforcing the perimeter of the acoustic mesh such that it resists permanent deformation. Thus, stiffener 230 may enable acoustic mesh 215 to sustain higher forces without resulting in plastic deformation.

Figure 4:
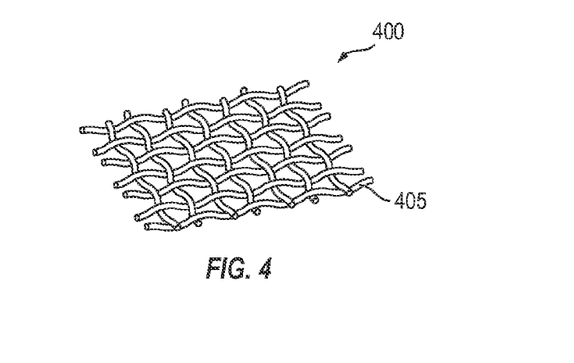
FIG. 4 is an isometric view of one embodiment of an acoustic mesh according to an embodiment of the invention.

Now referring to FIG. 4, a portion of one example of an acoustic mesh 400 is illustrated. In some embodiments acoustic mesh 400 may be made from multiple woven wires 405. In further embodiments wires 405 may be made from a material such as, but not limited to stainless steel. As discussed above, acoustic mesh 400 may be acoustically permeable while providing both protection for the acoustic element and an aesthetically pleasing appearance. That is, in some embodiments acoustic mesh 400 may partially obscure visibility into the aperture providing a less disrupted appearance of exterior surface 107 (see FIG. 1) of electronic device 100. In some embodiments acoustic mesh 400 may be relatively flat while in other embodiments it may be formed into two or three-dimensional shapes. Acoustic mesh 400 may be formed using any process, including but not limited to single-stage or progressive die forming.

Figure 5:
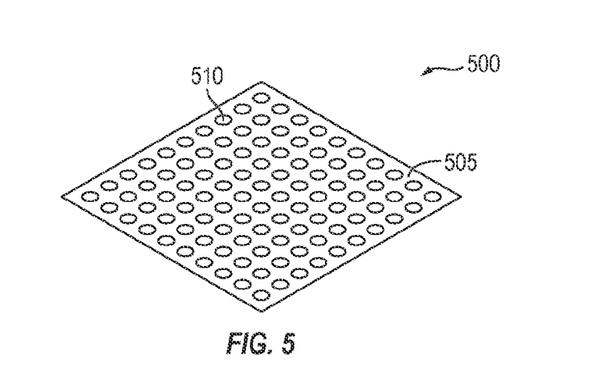
FIG. 5 is an isometric view of one embodiment of an acoustic mesh according to an embodiment of the invention.

Now referring to FIG. 5 another example of a portion of an acoustic mesh 500 is shown. In this embodiment acoustic mesh 500 is a plate 505 with multiple perforations 510. Myriad types of acoustic meshes may be used and are within the scope of this disclosure.

Figure 6:
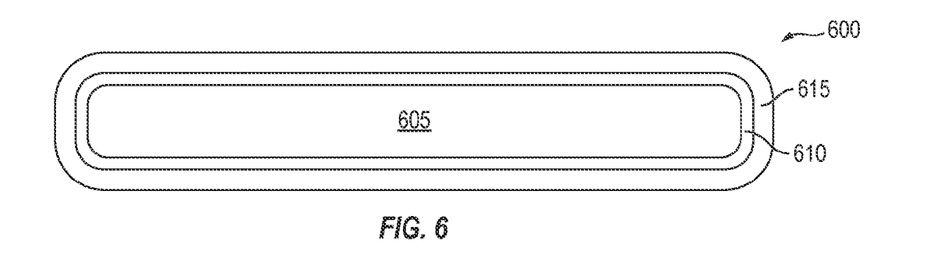
FIG. 6 is plan view of a single cavity stiffener that can be used in the electronic device shown in FIG. 1.
Figure 7:
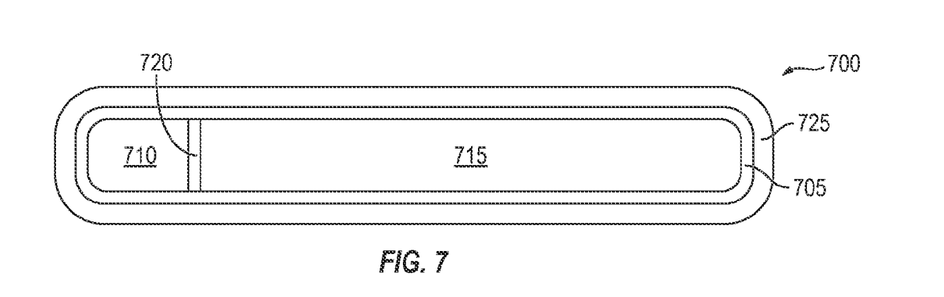
FIG. 7 is plan view of a dual cavity stiffener that can be used in the electronic device shown in FIG. 1.
Figure 8:
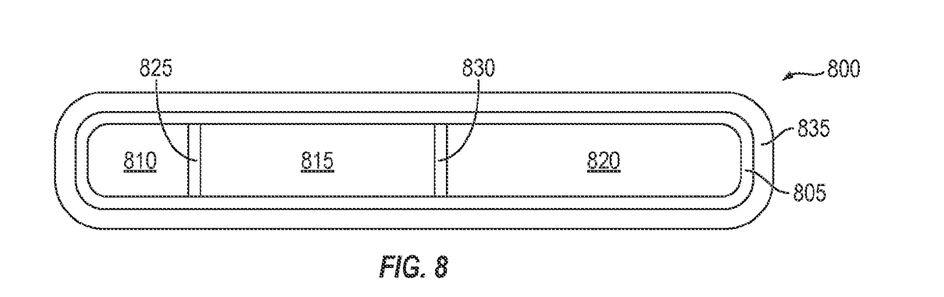
FIG. 8 is plan view of a triple cavity stiffener that can be used in the electronic device shown in FIG. 1.

Now referring to FIGS. 6-8, plan views of various embodiments of stiffeners, such as stiffener 230 illustrated in FIGS. 2 and 3, are shown. In some embodiments the stiffener may have more than one cavity which may provide acoustic isolation between acoustic elements, as discussed in more detail below. In some embodiments the stiffener may be made from a metal such as, for example, steel, stainless steel, tin, brass, or any other metal. In further embodiments the stiffener may be plated, painted or anodized to provide corrosion protection and an appropriate aesthetic appearance. In yet further embodiments, the stiffener may be made from a plastic or other material. Three configurations of stiffeners are illustrated, although other embodiments may employ different configurations and/or geometries.

Now referring to FIG. 6, a stiffener 600 having a single compartment 605 is illustrated. Stiffener 600 may have a vertical wall 610 that encloses compartment 605. In some embodiments, both a microphone and a speaker may be contained within compartment 605. Stiffener 600 may also have a horizontal flange 615.

Now referring to FIG. 7 another stiffener 700 is illustrated. Stiffener 700 may have a vertical wall 705 that encloses first and second compartments 710, 715, respectively. A divider 720 may form a barrier between first and second compartments 705, 710, respectively. Stiffener 700 may also have a horizontal flange 725. In one embodiment, first compartment 710 may contain a speaker and second compartment 715 may contain a microphone. In other embodiments first and second compartments 710, 715 respectively may contain different components. In further embodiments, divider 720 may serve as an acoustic isolation barrier, attenuating the interference of a speaker located in one cavity with a microphone located in the other cavity. In yet further embodiments, divider 720 may provide additional mechanical support to vertical wall 705.

Now referring to FIG. 8, another stiffener 800 is illustrated. Stiffener 800 may a vertical wall 805 that encloses first, second and third compartments 810, 815 and 820, respectively. Dividers 825, 830 may form barriers between first, second and third compartments 810, 815 and 820, respectively. Stiffener 800 may also have a horizontal flange 835. In one embodiment, first compartment 810 may contain a speaker, second compartment 815 may contain a first microphone and third compartment 820 may contain a second microphone. In other embodiments, first, second and third compartments 810, 815 and 820, respectively may contain other components. In further embodiments, dividers 825, 830 may serve as acoustic isolation barriers, attenuating the interference of a speaker located in one cavity with one or more microphones located in another cavity. In yet further embodiments, dividers 825, 830 may provide additional mechanical support to vertical wall 805. Other variations of stiffeners are possible and within the scope of this disclosure, including, but not limited to additional cavities, horizontal dividers, and different shapes of stiffeners such as squares, circles and closed polygons.

Figure 9:
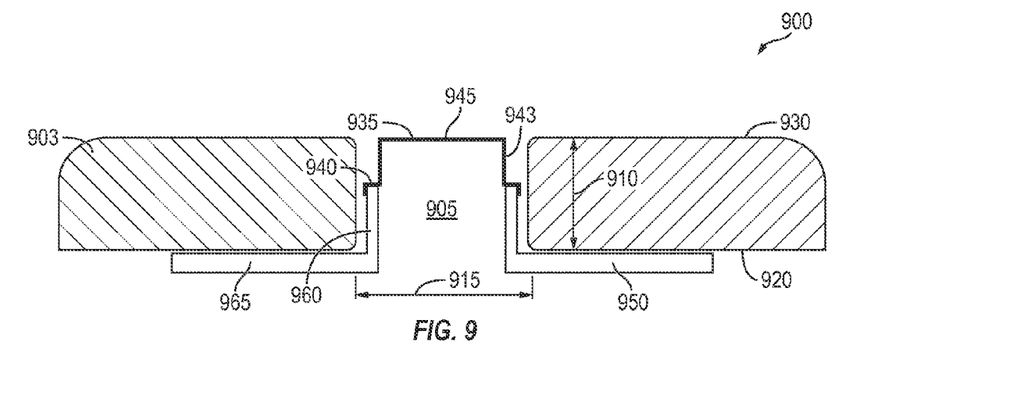
FIG. 9 is a partial cross-sectional view of another embodiment of a receiver aperture of an electronic device.

Now referring to FIG. 9, another embodiment is shown, illustrating how an acoustic mesh may be employed in an electronic device having a high aspect ratio aperture. In one embodiment, an electronic device 900 may have a ratio of a depth 910 of an aperture 905 to an opening 915 of the aperture that is relatively large (e.g., greater than or equal to 1:1 in some embodiments, 2:1 in some embodiments or 4:1 in some embodiments), resulting in a relatively tall and narrow aperture, as shown. Because of the high aspect ratio, it may be difficult to form an acoustic mesh that can start at an inner surface 920 of housing 903 and have a portion approximately coplanar with an exterior surface 930 of the housing. That is, in some embodiments the depth 910 to opening 915 ratio of aperture 905 may exceed the manufacturability limits of the acoustic mesh material. To place an acoustic mesh within aperture 905 with a portion of it proximate exterior surface 930, an acoustic mesh cap 935 may be constructed in a cup-shaped formation and used in conjunction with an extension, as described in more detail below.

In one embodiment, acoustic mesh cap 935 may have a flange portion 940 oriented parallel to inner surface 920 of housing 903, and a vertical portion 943 extending from the flange portion towards exterior surface 930 and along an inner wall of aperture 905. Acoustic mesh cap 935 may further have a horizontal portion 945 extending across aperture 905 substantially coplanar with exterior surface 930.

Extension 950 may be a formed structure similar to the aforementioned stiffener illustrated in FIG. 3, having a vertical wall 960 that extends within aperture 905 and a flange 965 that secures to inner surface 920 of housing 903. However, in this embodiment flange 965 of extension 950 may not extend to exterior surface 930 of housing 903. Instead, acoustic mesh cap 935 may be formed and disposed on a distal portion of vertical wall 960 such that the combination of extension 950 and acoustic mesh cap 935 enables horizontal portion 945 of acoustic mesh cap 935 to be placed substantially flush with exterior surface 930 of housing 903. In some embodiments, acoustic mesh cap 935 may be secured to extension 950 with a PSA or other material. In further embodiments acoustic mesh cap 935 may be welded to or insert molded to extension 950.

Figures 10, 11:
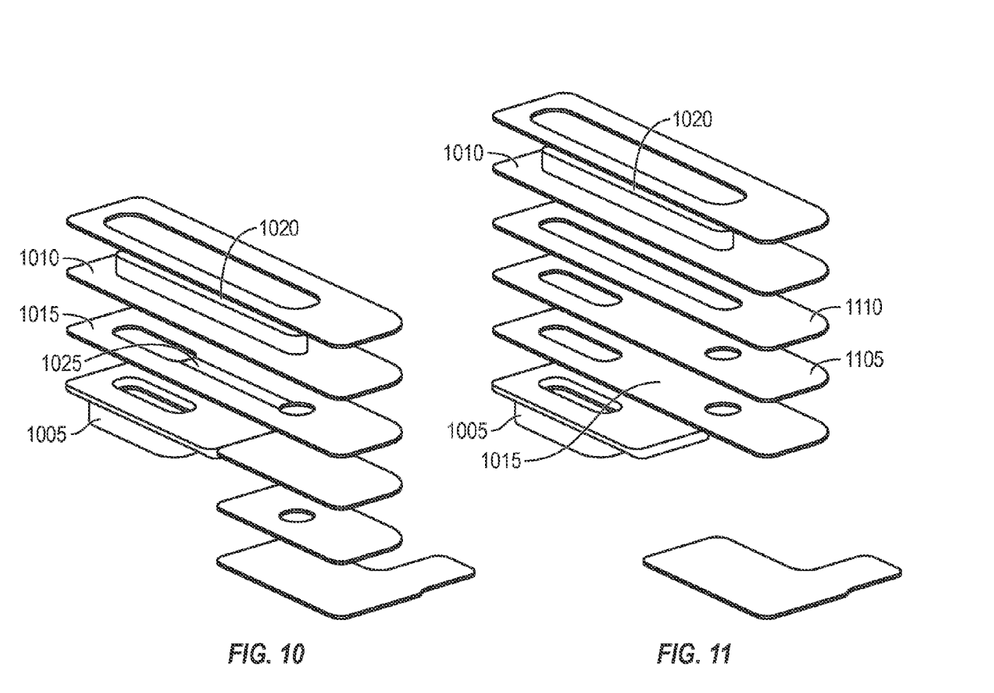
FIG. 10 is a partial isometric view of an acoustic element attached to a boot according to an embodiment of the invention.
FIG. 11 is a partial isometric view of an acoustic element attached to a boot including an acoustic mesh according to an embodiment of the invention.

Now referring to FIGS. 10 and 11 an embodiment is illustrated that may be used to improve the aesthetics of an acoustic element disposed within an aperture and attached to the electronic device with a PSA. As an illustrative example, FIG. 10 shows an embodiment where a microphone 1005 may be attached using a PSA so it may be disposed in an aperture such as aperture 125 in FIG. 1. In this embodiment microphone 1005 is attached to a boot 1010 using a first PSA 1015. A boot aperture 1020 may be aligned with aperture 125 (see FIG. 1) in housing 105 such that microphone 1005 is in acoustic communication with an exterior of the electronic device. In some applications, first PSA layer 1015 may bleed into center portion 1025 and be visible to a user through aperture 125 (see FIG. 1). More specifically, any PSA that bleeds into center portion 1025 may appear as a different color or reflectivity than other surfaces within aperture 125 (see FIG. 1) and may distract from the aesthetic appeal of the device. Some embodiments may improve the aesthetic appeal of such configurations, as discussed in more detail below.

Now referring to FIG. 11, an embodiment that may have improved aesthetic appeal is illustrated and shows a microphone 1005 attached to a boot 1010. First PSA layer 1015 may be bonded to an acoustic mesh layer 1105 such that the first acoustic mesh layer covers up center portion 1020 of boot. Such a configuration may provide a continuous and uniform appearance within aperture 125 (see FIG. 1) regardless of the amount of first PSA layer 1015 material that is within center portion 1020 of boot. That is, acoustic mesh layer 1105 may cover up any first PSA layer 1015 bleeding and provide a more uniform appearance within aperture 125

(see FIG. 1) resulting in improved aesthetic appeal. A second PSA layer 1110 may be used to bond acoustic mesh layer 1105 to boot 1010.

Figure 12:
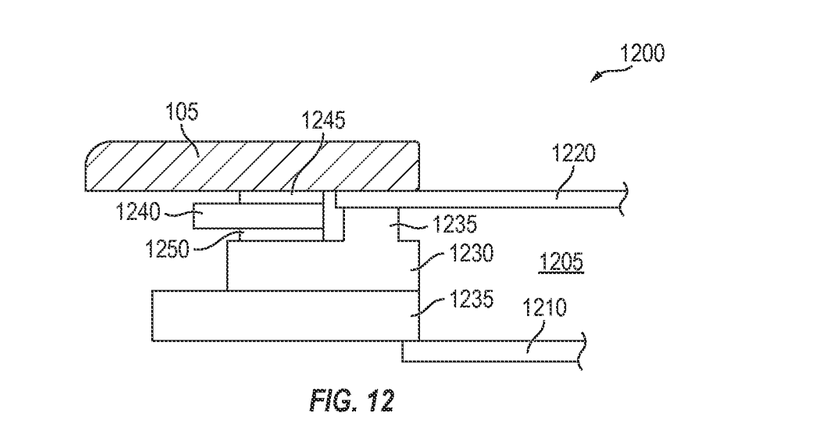
FIG. 12 is a partial cross-sectional view of a compressible acoustic seal formed around the periphery of an acoustic mesh according to an embodiment of the invention.

Now referring to FIG. 12, an embodiment is illustrated showing a structure that may be used to consistently position an acoustic mesh over an aperture in an electronic device housing while the simultaneously forming a reliable acoustic seal for an acoustic device mounted within the aperture. As discussed above, acoustic devices may be mounted within an aperture within a housing of an electronic device (see for example speaker 205 in aperture 125 illustrated in FIG. 2) and may receive or transmit sound waves through the aperture. An acoustic seal within the aperture may be beneficial to ensure the sound waves are minimally attenuated within the aperture and the acoustic device performance is optimized.

FIG. 12 illustrates a partial cross-sectional view of an electronic device 1200 having an aperture 1205 and an acoustic device 1210 within the aperture. This view may be similar to section A-A illustrated in FIG. 1. In this embodiment an acoustic mesh 1220 is secured over aperture 1205 and against housing 105 by protrusion 1235 on bracket 1230. Bracket 1230 may held in place by panel 1235.

Bracket 1230 may simultaneously form an acoustic seal within aperture 1205 by compressing an elastomer 1240 between bracket 1230 and housing 105. Elastomer 1240 is compressible such that it accommodates tolerances in bracket 1230, protrusion 1235 and acoustic mesh 1220. Thus, acoustic mesh 1220 may be consistently positioned against housing 105 and elastomer layer 1240 accommodates tolerances within the components such that it creates a consistent and reliable acoustic seal around perimeter of acoustic mesh 1220. In some embodiments elastomer layer 1240 may comprise a resilient foam-type material. In further embodiments, elastomer layer 1240 has a first PSA layer 1245 and a second PSA layer 1250 that adheres the elastomer layer to housing 105 and bracket 1230, respectively.

Figure 13:
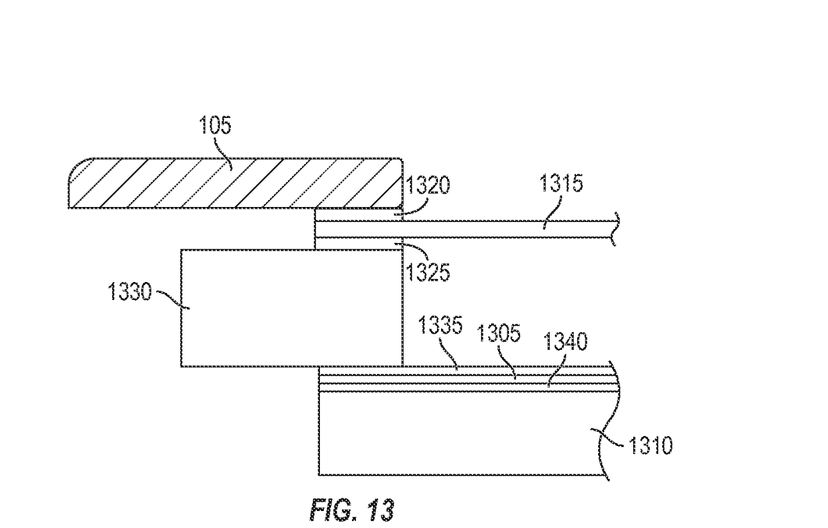
FIG. 13 is a partial cross-sectional view of a cosmetic acoustic mesh and a secondary acoustic mesh separated by a plate, according to an embodiment of the invention.

Now referring to FIG. 13, in some embodiments a secondary acoustic mesh 1305 may be disposed proximate an acoustic element 1310 while a cosmetic acoustic mesh 1315 may be disposed proximate housing 105. Cosmetic acoustic mesh 1315 may have a first layer 1320 and a second layer 1325 of PSA that adhere it between housing 105 and plate 1330, respectively. Secondary acoustic mesh 1305 may be located proximate acoustic element 1310 and have a first layer 1335 and a second layer 1340 of PSA that adheres acoustic element 1310 to plate 1330, respectively. In such embodiments, separating cosmetic acoustic mesh 1315 from secondary acoustic mesh 1305 may enable more consistent assembly processes as opposed to placing them adjacent one another such that there are two layers of acoustic mesh and four layers of PSA adjacent one another. In one embodiment, cosmetic acoustic mesh 1315 may comprise woven wires while secondary acoustic mesh 1305 may comprise a type of cloth. In other embodiments different types, configurations and arrangements of acoustic meshes may be used.

Although electronic device 100 (see FIG. 1) is described and illustrated as one particular electronic device, embodiments of the invention are suitable for use with a multiplicity of electronic devices. For example, any device that receives or transmits audio, video or data signals may be used with the invention. In some instances, embodiments of the invention are particularly well suited for use with portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, as well as tablet (e.g., Apple's iPad devices), laptop or other mobile computers. Some of these devices may be configured to provide audio, video or other data or sensory output.

For simplicity, various internal components, such as the control circuitry, graphics circuitry, bus, memory, storage device and other components of electronic device 100 (see FIG. 1) are not shown in the figures.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An electronic device comprising:
a housing having an outer surface opposite and adjacent to an inner surface;
an aperture disposed within the housing and having an inner wall extending from the outer surface to the inner surface;
an acoustic mesh having a flange portion disposed adjacent the inner surface, a vertical portion disposed within the aperture adjacent the inner wall extending from the inner surface towards the outer surface, and a horizontal portion extending across the aperture; and
a stiffener having a horizontal flange disposed along the flange portion of the acoustic mesh compressing the acoustic mesh against the inner surface, and a vertical wall disposed adjacent to the vertical portion of the acoustic mesh such that the acoustic mesh is disposed between the vertical wall of the stiffener and the inner wall of the aperture.

2. The electronic device of claim 1 wherein the vertical wall of the stiffener has a distal end that is positioned proximate the horizontal portion of the acoustic mesh.

3. The electronic device of claim 1 wherein the acoustic mesh comprises multiple woven wires.

4. The electronic device of claim 1 wherein the woven wires comprise steel.

5. The electronic device of claim 1 wherein the acoustic mesh is formed into a cup-shaped geometry such that the flange portion is disposed adjacent the inner surface of the housing and the horizontal portion is substantially coplanar with the outer surface of the housing.

6. The electronic device of claim 1 wherein the flange portion of the acoustic mesh is secured to the inner surface of the housing with a PSA.

7. The electronic device of claim 1 wherein the horizontal flange of the stiffener is secured to the horizontal portion of the acoustic mesh with a PSA.

8. The electronic device of claim 1 wherein a flexible boot structure has an opening aligned with the aperture in the housing and is secured to the stiffener.

9. The electronic device of claim 8 wherein an acoustic device is secured to the flexible boot structure and is aligned with the opening.

10. The electronic device of claim 1 wherein the stiffener has a first cavity and a second cavity separated by a divider.

11. An electronic device comprising:
a housing having an outer surface opposite and adjacent to an inner surface;
an aperture disposed within the housing and extending from the outer surface to the inner surface and having an inner wall therebetween;
an acoustic mesh in a cup-shaped formation, the acoustic mesh having a flange portion oriented parallel to the inner surface, a vertical portion extending from the flange portion towards the outer surface adjacent the inner wall, and a horizontal portion extending across the aperture;
a stiffener having a horizontal flange disposed along the inner surface of the housing and a vertical wall extending from the horizontal flange through the aperture towards the outer surface; and
a bond between the flange portion of the acoustic mesh and the stiffener.

12. The electronic device of claim 11 wherein the vertical wall of the flange has a distal end bonded to the flange portion of the acoustic mesh.

13. The electronic device of claim 11 wherein the horizontal portion of the acoustic mesh is substantially coplanar with the outer surface of the electronic device.

14. The electronic device of claim 11 wherein the flange portion of the acoustic mesh is disposed adjacent to the inner surface of the housing and the horizontal flange of the stiffener is disposed adjacent to the flange portion.

15. An electronic device comprising:
a housing having an outer surface disposed opposite and adjacent an inner surface and an aperture extending from the inner surface to the outer surface;
an acoustic mesh disposed against the inner surface of the housing and across the aperture, and having a mounting portion that extends beyond a perimeter of the aperture;
an elastomeric layer disposed against the inner surface of the housing and encircling the acoustic mesh; and
a bracket disposed within the housing having a protrusion configured to compress the mounting portion of the acoustic mesh to the inner surface of the housing and a second surface configured to compress the elastomeric layer against the inner surface of the housing.

16. The electronic device of claim 15 wherein the elastomeric layer forms an acoustic seal between the bracket and the housing.

17. The electronic device of claim 15 further comprising an acoustic device in communication with the aperture and secured to the bracket.

18. The electronic device of claim 15 wherein the elastomeric layer has a first PSA that adheres it to the inner surface of the housing and a second PSA layer that secures it to the bracket.

19. The electronic device of claim 15 further comprising a plate disposed adjacent the bracket that secures the bracket against the housing.

20. The electronic device of claim 15 wherein the acoustic mesh comprises woven wires.

* * * * *